United States Patent
Maemura et al.

(10) Patent No.: US 12,427,875 B2
(45) Date of Patent: Sep. 30, 2025

(54) WIRELESS POWER TRANSMISSION SYSTEM

(71) Applicant: TOYOTA JIDOSHA KABUSHIKI KAISHA, Toyota (JP)

(72) Inventors: Masato Maemura, Nisshin (JP); Toshiya Hashimoto, Miyoshi (JP); Shogo Tsuge, Fuji (JP); Ryosuke Ikemura, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 28 days.

(21) Appl. No.: 18/544,712

(22) Filed: Dec. 19, 2023

(65) Prior Publication Data

US 2024/0294074 A1    Sep. 5, 2024

(30) Foreign Application Priority Data

Mar. 2, 2023 (JP) ................... 2023-032254

(51) Int. Cl.
| | |
|---|---|
| *B60L 53/122* | (2019.01) |
| *B60L 53/30* | (2019.01) |
| *H02J 50/00* | (2016.01) |
| *H02J 50/12* | (2016.01) |

(52) U.S. Cl.
CPC ........... *B60L 53/122* (2019.02); *B60L 53/305* (2019.02); *H02J 50/005* (2020.01); *H02J 50/12* (2016.02); *H02J 2310/48* (2020.01)

(58) Field of Classification Search
CPC ...... B60L 53/122; B60L 53/305; B60L 53/12; B60L 53/126; H02J 50/005; H02J 50/12; H02J 2310/48; H02J 50/10; H02J 50/80; H02J 50/90; H02J 50/40; H02J 50/60; H02J 50/70
See application file for complete search history.

(56) References Cited

U.S. PATENT DOCUMENTS

| | | | |
|---|---|---|---|
| 2013/0300354 A1 | 11/2013 | Ichikawa et al. | |
| 2016/0016478 A1* | 1/2016 | Saito | H01F 27/402 |
| | | | 307/104 |
| 2019/0097471 A1* | 3/2019 | Pantic | H02J 50/12 |

FOREIGN PATENT DOCUMENTS

JP    2013-240132 A    11/2013

* cited by examiner

*Primary Examiner* — Lincoln D Donovan
*Assistant Examiner* — Alex W Lam
(74) *Attorney, Agent, or Firm* — SoraIP, Inc.

(57) ABSTRACT

The wireless power transmission system according to the present disclosure includes: a supply device installed on the road side and transmitting electric power; a vehicle equipped with a power receiving device and traveling on the road; wherein in the wireless power transmission system, a power receiving device receives power from a supply device and wirelessly transmits the power to a vehicle, the supply device is a primary coil that generates a magnetic field for transmitting power to the vehicle; a first communication device that performs short-range wireless communication with the vehicle; the vehicle includes a secondary coil that receives power transmitted contactlessly from the primary coil; a second communication device that performs short-range wireless communication with the supply device; in the first and second communication devices, one communication device has a single communication unit, and the other communication device has a plurality of communication units.

17 Claims, 8 Drawing Sheets

FIG. 9
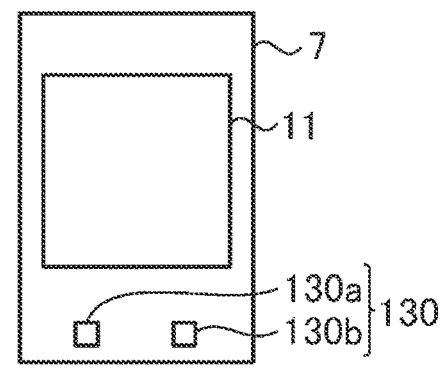
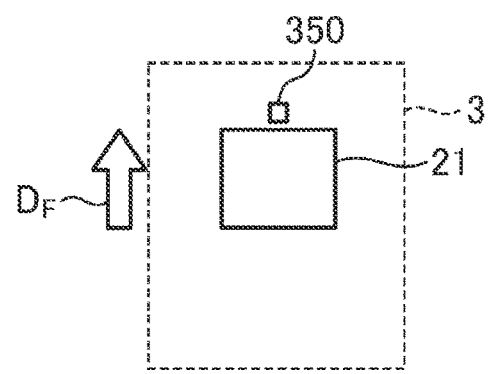
FIG. 10
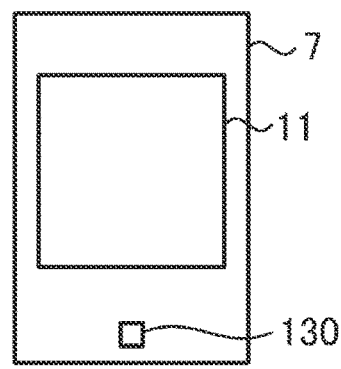
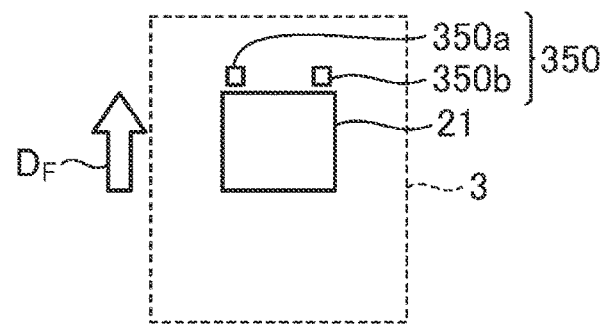

WIRELESS POWER TRANSMISSION SYSTEM

CROSS-REFERENCE TO RELATED APPLICATION

This application claims priority to Japanese Patent Application No. 2023-032254 filed on Mar. 2, 2023, incorporated herein by reference in its entirety.

BACKGROUND

1. Technical Field

The present disclosure relates to a wireless power transmission system.

2. Description of Related Art

Japanese Unexamined Patent Application Publication No. 2013-240132 (JP 2013-240132 A) discloses a technique for pairing a power transmitting device and a power receiving device in a non-contact power supply system in which information can be transmitted between the power transmitting device and the power receiving device by wireless communication.

SUMMARY

In traveling power supply in which power is transmitted while the vehicle is traveling, in order to efficiently perform charging, it is important to align the positions of a power transmitting side and a power receiving side. In short-range wireless communications, there is a particular need for uninterrupted communication.

The present disclosure has been made in view of the above, and an object of the present disclosure is to provide a wireless power transmission system that can align the positions of the power transmitting side and the power receiving side with high precision.

A wireless power transmission system according to the present disclosure includes:
- a supply device that is installed on a road side and transmits power; and
- a vehicle that is equipped with a power receiving device and travels on a road.

In the wireless power transmission system, the power receiving device receives power from the supply device and wirelessly transmits the power to the vehicle.

The supply device includes:
- a primary coil that generates a magnetic field for power transmission to the vehicle, and
- a first communication device that performs short-range wireless communication with the vehicle.

The vehicle includes:
- a secondary coil that receives power transmitted from the primary coil in a non-contact manner, and
- a second communication device that performs the short-range wireless communication with the supply device.

In the first and second communication devices, one of the first and second communication devices includes a single communication unit, and the other of the first and second communication devices includes a plurality of communication units.

According to the present disclosure, it is possible to align the positions of a power transmitting side and a power receiving side in a wireless power transmission system.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 9 is a diagram for explaining the arrangement of the second communication device and the fourth device; and FIG. 10 is a diagram for explaining the arrangement of the second communication device and the fourth device in a modified example.

DETAILED DESCRIPTION OF EMBODIMENTS

Hereinafter, a wireless power transmission system according to an embodiment of the present disclosure will be specifically described. The present disclosure is not limited to the embodiments described below.

Figure 1:
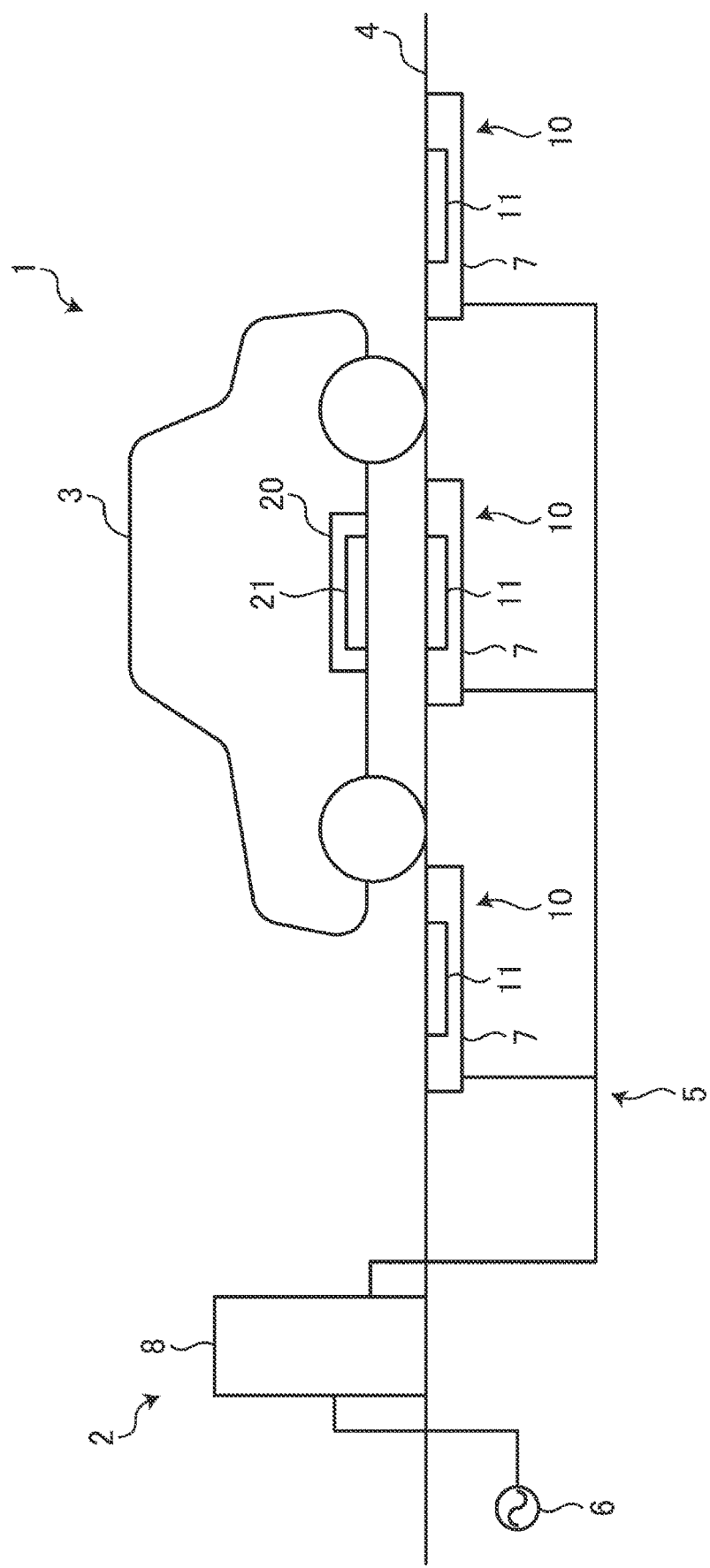
FIG. 1 is a schematic diagram showing a wireless power transmission system in an embodiment.

FIG. 1 is a schematic diagram showing a wireless power transmission system in an embodiment. The wireless power transmission system 1 includes a supply facility 2 and a vehicle 3. The supply facility 2 is equipment that supplies electric power to the running vehicle 3 in a non-contact manner. The vehicle 3 is an electrified vehicle that can be charged with electric power supplied from an external power source, such as a battery electric vehicle (BEV) or a plug-in hybrid electric vehicle (PHEV).

This wireless power transmission system 1 performs wireless power transmission from a supply facility 2 to a vehicle 3 by magnetic field resonance coupling (magnetic field resonance). The wireless power transmission system 1 transmits power from a supply facility 2 to a vehicle 3 running on a road 4 in a non-contact manner. That is, the wireless power transmission system 1 transmits power using a magnetic resonance method, and realizes power supply to the vehicle 3 while the vehicle is running using magnetic resonance coupling (magnetic field resonance). The wireless power transmission system 1 can be expressed as a dynamic wireless power transfer (D-WPT) system or a magnetic field dynamic wireless power transfer (MF-D-WPT) system.

The supply facility 2 includes a supply device 5 and an alternating current (AC) power source 6 that supplies power to the supply device 5. The supply device 5 transmits power supplied from the AC power source 6 to the vehicle 3 in a non-contact manner. The AC power source 6 is, for example, a commercial power source. This supply device 5 includes a power transmission device 10 having a primary coil 11.

The supply device 5 includes a segment 7 including a primary coil 11 and a management device 8 that manages the segment 7. Segment 7 is embedded within the lane of road 4. The management device 8 is installed on the side of the road 4. Segment 7 is electrically connected to management device 8. The management device 8 is electrically connected to the AC power source 6 and supplies power from the AC power source 6 to the segments 7. The segment 7 is electrically connected to the AC power source 6 via the management device 8. A plurality of segments 7 can be arranged along the lanes of the road 4. For example, as shown in FIG. 1, the supply device 5 includes three segments 7 installed in line along a lane on the road 4, and one management device 8 to which the three segments 7 are connected. The segment 7 has a function of transmitting electric power from the supply device 5 to the vehicle 3 in a contactless manner. The management device 8 has a function of controlling wireless power transmission in the segment 7.

The vehicle 3 includes a power receiving device 20 having a secondary coil 21. The power receiving device 20 is provided at the bottom of the vehicle 3. When the vehicle 3 travels on the road 4 on which the primary coil 11 is installed, the primary coil 11 on the ground side and the secondary coil 21 on the vehicle side face each other in the vertical direction. The wireless power transmission system 1 transmits power from the primary coil 11 of the power transmission device 10 to the secondary coil 21 of the power receiving device 20 in a non-contact manner while the vehicle 3 is traveling on the road 4.

In this description, traveling means a state in which the vehicle 3 is located on the road 4 for traveling. While traveling, a state in which the vehicle 3 is temporarily stopped on the road 4 is also included. For example, a state in which the vehicle 3 is stopped on the road 4 due to waiting at a traffic light or the like is also included in the traveling state. On the other hand, even if the vehicle 3 is located on the road 4, for example, if the vehicle 3 is parked or stopped, it is not included in the running state.

In addition, in this explanation, the lane in which the primary coil 11 (segment 7) is embedded is referred to as the D-WPT lane, which is a part of the road 4 where wireless power transmission by the supply device 5 is possible. This is sometimes referred to as a D-WPT charging site. In the D-WPT lane and the D-WPT charging site, a plurality of primary coils 11 (a plurality of segments 7) are installed in line in the traveling direction of the vehicle 3 over a predetermined section of the road 4.

Figure 2:
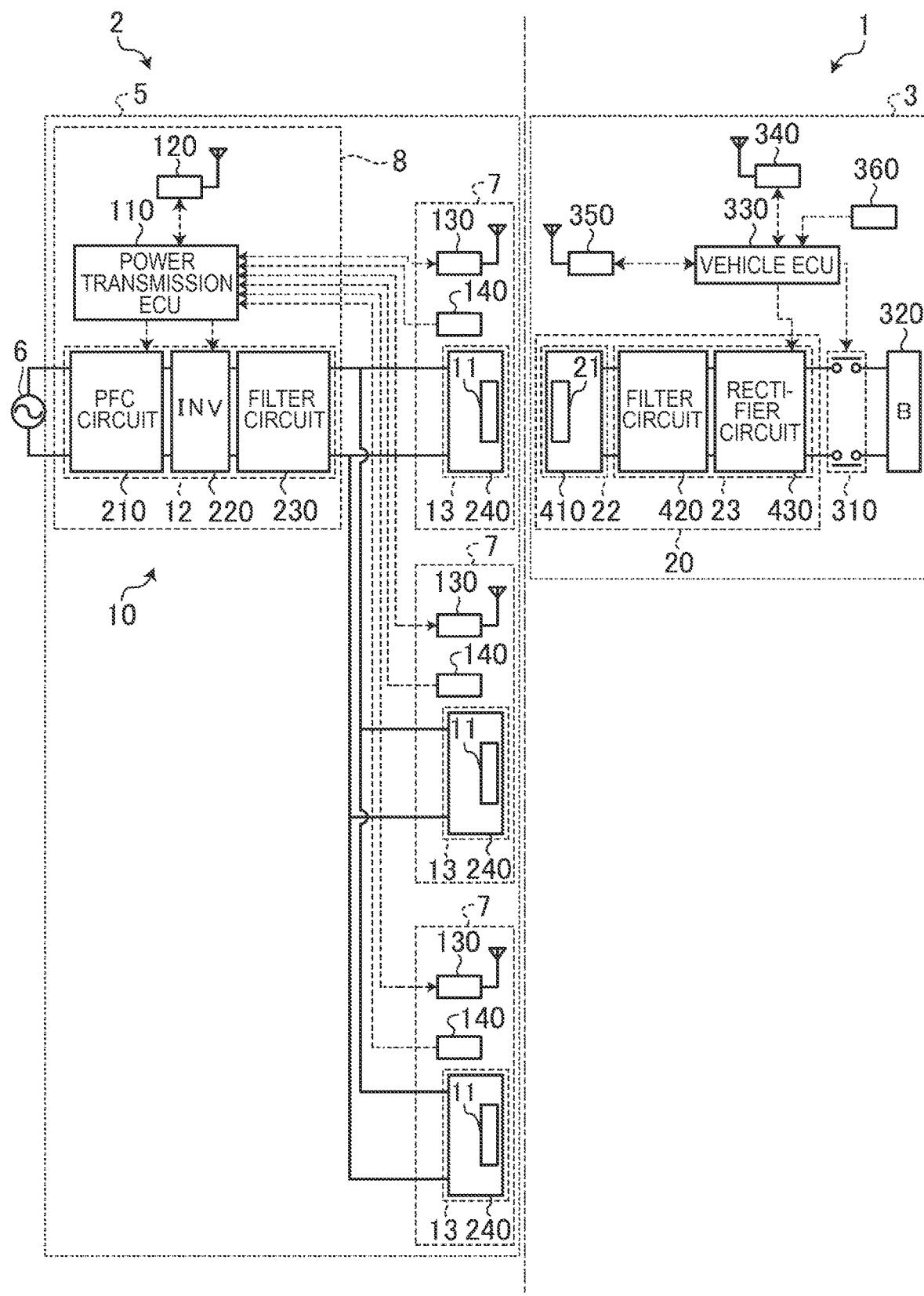
FIG. 2 is a diagram showing the overall configuration of the wireless power transmission system.

FIG. 2 is a diagram showing the overall configuration of the wireless power transmission system. In the supply facility 2, a supply device 5 and an AC power source 6 are electrically connected. In the supply device 5, the segment 7 and the management device 8 are electrically connected.

The supply device 5 includes a configuration provided in the management device 8 and a configuration provided in the segment 7. The supply device 5 includes a power transmission device 10, a power transmission electronic control unit (power transmission ECU) 110, a first communication device 120, a second communication device 130, and a foreign object detection device 140.

Power transmission device 10 includes an electric circuit connected to AC power source 6. The power transmission device 10 includes a power factor collection circuit (PFC circuit) 210, an inverter (INV) 220, a filter circuit 230, and a power transmission side resonant circuit 240.

PFC circuit 210 improves the power factor of AC power input from AC power source 6, converts the AC power into direct current (DC) power, and outputs the DC power to inverter 220. This PFC circuit 210 is configured to include an AC/DC converter. PFC circuit 210 is electrically connected to AC power source 6.

Inverter 220 converts DC power input from PFC circuit 210 into AC power. Each switching element of the inverter 220 is composed of an insulated gate bipolar transistor (IGBT), a metal-oxide-semiconductor field effect transistor (MOSFET), etc., and performs a switching operation in response to a control signal from the power transmission ECU 110. For example, the driving frequency of inverter 220 is 85 kHz. Inverter 220 outputs the converted AC power to filter circuit 230.

The filter circuit 230 removes noise contained in the alternating current input from the inverter 220 and supplies the noise-free alternating current power to the power transmission side resonant circuit 240. The filter circuit 230 is an LC filter that combines a coil and a capacitor. For example, the filter circuit 230 is constituted by a T-type filter in which two coils and one capacitor are arranged in a T-shape. The PFC circuit 210, the inverter 220, and the filter circuit 230 constitute the power conversion unit 12 of the power transmission device 10.

The power transmission side resonant circuit 240 is a power transmission unit that transmits the AC power supplied from the filter circuit 230 to the power receiving device 20 in a non-contact manner. When AC power is supplied from the filter circuit 230 to the power transmission side resonant circuit 240, current flows through the primary coil 11, and a magnetic field for power transmission is generated.

The power transmission side resonant circuit 240 includes a primary coil 11 and a resonant capacitor. The primary coil 11 is a power transmission coil. This resonant capacitor is connected in series to one end of the primary coil 11, and adjusts the resonant frequency of the power transmission side resonant circuit. This resonant frequency is between 10 kHz and 100 GHz, preferably 85 kHz. For example, the power transmission device 10 is configured such that the resonance frequency of the power transmission side resonant circuit 240 and the drive frequency of the inverter 220 match. The power transmission side resonant circuit 240 constitutes the primary device 13 of the power transmission device 10.

The power transmission device 10 includes a power conversion unit 12 and a primary device 13. Power conversion unit 12 includes a PFC circuit 210, an inverter 220, and a filter circuit 230. The primary device 13 includes a power transmission side resonant circuit 240. The power transmission device 10 has a configuration in which the power conversion unit 12 is provided in the management device 8 and the primary device 13 is provided in the segment 7.

In the supply device 5, the power conversion unit 12, the power transmission ECU 110, and the first communication device 120 of the power transmission device 10 are provided in the management device 8. The primary device 13 of the power transmission device 10, the second communication device 130, and a foreign object detection device 140 are provided in the segment 7.

Power transmission ECU 110 is an electronic control device that controls supply device 5. Power transmission ECU 110 includes a processor and memory. The processor includes a central processing unit (CPU), a digital signal processor (DSP), a field-programmable gate array (FPGA), and the like. Memory is a main storage device, and includes random access memory (RAM), read only memory (ROM), and the like. The power transmission ECU 110 loads a program stored in a storage unit into a working area of memory (main memory) and executes it, controls each component through the execution of the program, and realizes functions that meet a predetermined purpose. The storage unit includes a recording medium such as an erasable programmable ROM (EPROM), a hard disk drive (HDD), and a removable medium. Examples of removable media include disc recording media such as universal serial bus memory (USB memory), compact disc (CD), digital versatile disc (DVD), and Blu-ray (registered trademark) Disc (BD). The storage unit can store an operating system (OS), various programs, various tables, various databases, and the like. Signals from various sensors are input to power transmission ECU 110. A signal from foreign object detection device 140 is input to power transmission ECU 110. Power transmission ECU 110 then executes various controls based on signals input from various sensors.

For example, power transmission ECU 110 executes power control to adjust power for power transmission. In power control, power transmission ECU 110 controls power transmission device 10. Power transmission ECU 110 outputs a control signal to power conversion unit 12 in order to control the power supplied from power conversion unit 12 to primary device 13. Power transmission ECU 110 controls a switching element included in PFC circuit 210 to adjust power for transmission, and also controls a switching element included in inverter 220 to adjust power for transmission.

Furthermore, power transmission ECU 110 executes communication control to control communication with vehicle 3. In communication control, power transmission ECU 110 controls first communication device 120 and second communication device 130.

The first communication device 120 is a ground-side communication device that performs wide area wireless communication. The first communication device 120 performs wireless communication with a vehicle 3 that is before approaching the WPT lane among vehicles 3 that are traveling on the road 4. The state before approaching the WPT lane means that the vehicle 3 is in a position where it cannot perform short-range wireless communication with the supply device 5.

Wide area wireless communication is communication with a communication distance of 10 meters to 10 kilometers. Wide area wireless communication has a longer communication distance than narrow area wireless communication. As the wide area wireless communication, various types of wireless communication having a long communication distance can be used. For example, communication based on communication standards such as 4G, LTE, 5G, and WiMAX established by 3GPP (registered trademark) and IEEE is used for wide area wireless communication. In the wireless power transmission system 1, vehicle information linked to vehicle identification information (vehicle ID) is transmitted from the vehicle 3 to the supply device 5 using wide area wireless communication.

The second communication device 130 is a ground-side communication device that performs short-range wireless communication. The second communication device 130 performs wireless communication with a vehicle 3 that approaches or enters the WPT lane among the vehicles 3 traveling on the road 4. The state approaching the WPT lane means that the vehicle 3 is in a position where it can perform short-range wireless communication with the supply device 5.

Short-range wireless communication is communication with a communication distance of less than 10 meters. Short-range wireless communication is communication that has a shorter communication distance than wide-area wireless communication. As the short-range wireless communication, various short-range wireless communications with short communication distances can be used. For example, communication based on any communication standard established by IEEE, ISO, IEC, etc. is used for short-range wireless communication. As an example, Wi-Fi (registered trademark), Bluetooth (registered trademark), ZigBee (registered trademark), etc. are used for short-range wireless communication. Alternatively, radio frequency identification (RFID), dedicated short range communication (DSRC), etc. may be used as a technique for performing short range wireless communication. In the wireless power transmission system 1, vehicle identification information and the like are transmitted from the vehicle 3 to the supply device 5 using short-range wireless communication.

The foreign object detection device 140 detects metal foreign objects, living organisms, etc. present above the primary coil 11. The foreign object detection device 140 includes, for example, a sensor coil installed on the ground, an imaging device, and the like. The foreign object detection device 140 is used to perform a foreign object detection function (FOD) and a living object protection function (LOP) in the wireless power transmission system 1.

In the supply device 5, the configuration of the power transmission device 10 is divided into segments 7 and management device 8, and three segments 7 are connected to one management device 8. The power transmission device 10 is configured such that one inverter supplies power to three power transmission side resonance circuits 240. Further, in the supply device 5, signals from each segment 7 are input to the management device 8. Signals from the second communication device 130 and foreign object detection device 140 provided in the first segment are input to the power transmission ECU 110. Similarly, signals from the second communication device 130 and the foreign object detection device 140 provided in the second segment are input to the power transmission ECU 110. Signals from the second communication device 130 and foreign object detection device 140 provided in the third segment are input to the power transmission ECU 110. The power transmission ECU 110 can grasp the state of each segment 7 based on the signals input from each segment 7.

The vehicle 3 includes a power receiving device 20, a charging relay 310, a battery 320, a vehicle ECU 330, a third communication device 340, a fourth communication device 350, and a global positioning system receiver (GPS receiver) 360.

Power receiving device 20 supplies power received from power transmission device 10 to battery 320. Power receiving device 20 is electrically connected to battery 320 via charging relay 310. The power receiving device 20 includes a power receiving side resonant circuit 410, a filter circuit 420, and a rectifier circuit 430.

The power receiving side resonant circuit 410 is a power receiving unit that receives power transmitted contactlessly from the power transmission device 10. The power receiving side resonant circuit 410 is configured by a power receiving side resonant circuit including the secondary coil 21 and a resonant capacitor. The secondary coil 21 is a power receiving coil that receives power transmitted from the primary coil 11 in a non-contact manner. This resonant capacitor is connected in series to one end of the secondary coil 21 and adjusts the resonant frequency of the power receiving side resonant circuit. The resonant frequency of the power receiving side resonant circuit 410 is determined to match the resonant frequency of the power transmission side resonant circuit 240.

The resonant frequency of the power receiving side resonant circuit 410 is the same as the resonant frequency of the power transmission side resonant circuit 240. Therefore, when a magnetic field is generated by the power transmission side resonant circuit 240 while the power receiving side resonant circuit 410 faces the power transmission side resonant circuit 240, the vibration of the magnetic field is transmitted to the power receiving side resonant circuit 410. The primary coil 11 and the secondary coil 21 enter into a resonant state. When an induced current flows through the secondary coil 21 due to electromagnetic induction, an induced electromotive force is generated in the power receiving side resonant circuit 410. The power receiving side resonant circuit 410 receives the power transmitted contactlessly from the power transmission side resonant circuit 240 in this manner. The power receiving side resonant circuit 410 then supplies the power received from the power transmission side resonant circuit 240 to the filter circuit 420. The power receiving side resonant circuit 410 constitutes the secondary device 22 of the power receiving device 20.

The filter circuit 420 removes noise contained in the alternating current input from the power receiving side resonant circuit 410 and outputs the noise-removed alternating current power to the rectifier circuit 430. Filter circuit 420 is an LC filter that combines a coil and a capacitor. For example, the filter circuit 420 is constituted by a T-type filter in which two coils and one capacitor are arranged in a T-shape.

The rectifier circuit 430 converts the AC power input from the filter circuit 420 into DC power and outputs the DC power to the battery 320. The rectifier circuit 430 is configured by, for example, a full-bridge circuit in which four diodes are connected as rectifiers in a full-bridge manner. A switching element is connected in parallel to each diode of the rectifier circuit 430. Each switching element of the rectifier circuit 430 is constituted by an IGBT, and performs a switching operation in response to a control signal from the vehicle ECU 330. Rectifier circuit 430 supplies the converted DC power to battery 320. The filter circuit 420 and the rectifier circuit 430 constitute the power conversion unit 23 of the power receiving device 20.

The power receiving device 20 includes a secondary device 22 and a power conversion unit 23. Secondary device 22 includes a power receiving side resonant circuit 410. Power conversion unit 23 includes a filter circuit 420 and a rectifier circuit 430.

Charging relay 310 is provided between rectifier circuit 430 and battery 320. The opening/closing state of charging relay 310 is controlled by vehicle ECU 330. When the power transmission device 10 charges the battery 320, the charging relay 310 is controlled to be in the closed state. When charging relay 310 is in the closed state, rectifier circuit 430 and battery 320 are electrically connected. When charging relay 310 is in the open state, current cannot flow between rectifier circuit 430 and battery 320. For example, when charging relay 310 is in an open state, vehicle 3 does not request power supply.

The battery 320 is a rechargeable DC power source, and is configured with, for example, a lithium ion battery, a nickel metal hydride battery, or the like. The battery 320 stores power supplied from the power transmission device 10 to the power receiving device 20. Further, the battery 320 can supply power to the driving motor of the vehicle 3. The battery 320 is electrically connected to the driving motor via a power control unit (PCU). The PCU is a power conversion device that converts DC power from the battery 320 into AC power and supplies the AC power to the driving motor. Each switching element of the PCU is composed of an IGBT, and performs a switching operation in response to control signals from the vehicle ECU 330 and the like.

Vehicle ECU 330 is an electronic control unit that controls vehicle 3. Vehicle ECU 330 has the same hardware configuration as power transmission ECU 110. Signals from various sensors mounted on the vehicle 3 are input to the vehicle ECU 330. Furthermore, the positioning signal received by the GPS receiver 360 is input to the vehicle ECU 330. Vehicle ECU 330 can acquire current position information of vehicle 3 from GPS receiver 360. Vehicle ECU 330 then executes various controls based on signals input from various sensors.

For example, the vehicle ECU 330 executes contactless charging control in which power is transmitted from the primary coil 11 to the secondary coil 21 in a contactless manner and the power received by the secondary coil 21 is stored in the battery 320. In non-contact charging control, vehicle ECU 330 controls rectifier circuit 430, charging relay 310, third communication device 340, and fourth communication device 350. The non-contact charging control includes power control that controls charging power and communication control that controls communication with the supply device 5. In power control, vehicle ECU 330 controls switching elements included in rectifier circuit 430 to adjust the power (charging power) supplied from power receiving device 20 to battery 320. In communication control, vehicle ECU 330 controls third communication device 340 and fourth communication device 350.

The third communication device 340 is a vehicle-side communication device that performs wide area wireless communication. The third communication device 340 performs wireless communication with the first communication device 120 of the supply device 5 before the vehicle 3 traveling on the road 4 approaches the WPT lane. Wide area wireless communication is two-way wireless communication. Communication between the first communication device 120 and the third communication device 340 is performed by high-speed wireless communication.

The fourth communication device 350 is a vehicle-side communication device that performs short-range wireless communication. The fourth communication device 350 performs wireless communication with the second communication device 130 of the supply device 5 when the vehicle 3 approaches or enters the WPT lane. Short-range wireless communication is unidirectional wireless signaling. Unidirectional wireless signaling is point to point signaling (P2PS). P2PS is used to notify vehicle identification information from the vehicle 3 to the supply device 5 in each activity of pairing, alignment check, magnetic coupling check, end of power transfer, and end of power transfer. Furthermore, P2PS can be used as a means for checking alignment in the lateral direction (Alignment check). The lateral direction refers to the width direction of the lane and the width direction of the vehicle 3.

GPS receiver 360 detects the current position of vehicle 3 based on positioning information obtained from a plurality of positioning satellites. Current position information of vehicle 3 detected by GPS receiver 360 is transmitted to vehicle ECU 330.

Note that in the supply device 5, the filter circuit 230 may be included in the management device 8 instead of the segment 7. That is, the filter circuit 230 may be installed on the side of the road 4. In this case, the power conversion unit 12 includes a PFC circuit 210, an inverter 220, and a filter circuit 230, and the primary device 13 includes a power transmission side resonant circuit 240.

Further, the filter circuit 230 may be provided for each primary coil 11 individually, or may be provided for a plurality of primary coils 11 all at once.

Further, the filter circuit 230 is not limited to a T-type filter, but may be a bandpass filter in which a coil and a capacitor are connected in series, for example. This also applies to the filter circuit 420 of the vehicle 3.

Further, in the power transmission device 10, when the inverter 220 is connected to the plurality of primary coils 11, each primary device 13 may be provided with a changeover switch for switching the primary coil 11 to be energized. This changeover switch may be provided in the management device 8 beside the road 4, or may be provided near the primary coil 11.

Further, the power transmission side resonant circuit 240 is not limited to a configuration in which the primary coil 11 and the resonant capacitor are connected in series. The primary coil 11 and the resonant capacitor may be connected in parallel, or may be a combination of parallel and series connections. In short, the power transmission side resonant circuit 240 may be configured such that the resonance frequency of the power transmission side resonant circuit 240 matches the drive frequency of the inverter 220, and the connection relationship of its components is not particularly limited. This also applies to the power receiving side resonant circuit 410 of the vehicle 3.

Further, the driving frequency of the inverter 220 is not limited to 85 kHz, but may be a frequency around 85 kHz. In short, the driving frequency of inverter 220 may be in a predetermined frequency band including 85 kHz.

Further, the power transmission device 10 may have a configuration in which a plurality of inverters 220 are connected to the output side power line (DC power line) of the PFC circuit 210.

Further, the foreign object detection device 140 may be provided not only on the ground side but also on the vehicle 3 side. For example, when the foreign object detection device on the vehicle 3 side detects a foreign object or a living body present above the primary coil 11, the power supply request can be stopped until the vehicle 3 passes the primary coil 11.

In addition, in the wireless power transmission system 1, the information transmitted from the vehicle 3 to the supply device 5 using short-range wireless communication includes, in addition to vehicle identification information, a power supply request, a power supply request value, etc. The power supply request is information indicating that power transmission from the primary coil 11 is requested. The required power supply value is a required value of the amount of power transmitted from the supply device 5 to the vehicle 3. Vehicle ECU 330 can calculate the required power supply value based on the SOC of battery 320.

Furthermore, the wireless power transmission system 1 is not limited to the method of feeding power from the ground to the vehicle 3, but can also realize a method of feeding power from the vehicle 3 to the ground. In this case, the rectifier circuit 430 can be replaced with an inverter to realize rectification during power supply and power reception.

Figure 3:
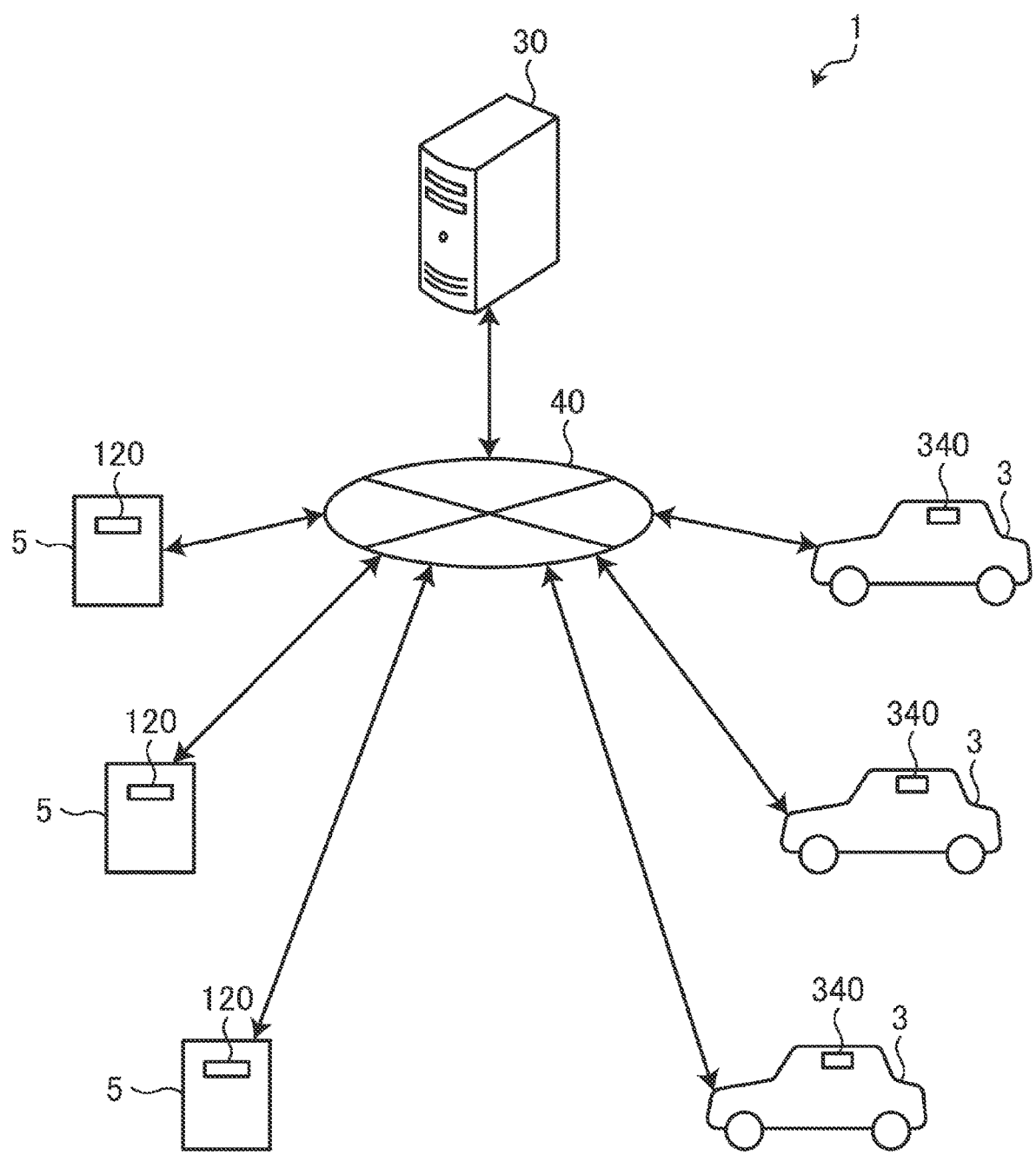
FIG. 3 is a schematic diagram for explaining wide area wireless communication in a wireless power transmission system.

FIG. 3 is a schematic diagram for explaining wide area wireless communication in a wireless power transmission system.

In the wireless power transmission system 1, the vehicle 3 can communicate with the server 30, and the supply device 5 can communicate with the server 30. The server 30 is connected to a network 40 and can communicate with multiple vehicles 3 and multiple supply devices 5 via the network 40. The network 40 includes a wide area network (WAN), which is a public communication network such as the Internet, a telephone communication network of a mobile phone, and the like.

The vehicle 3 connects to the network 40 by wide area wireless communication using the third communication device 340. Vehicle 3 transmits information to server 30 and receives information from server 30.

The supply device 5 connects to the network 40 by wide area wireless communication using the first communication device 120. The supply device 5 transmits information to the server 30 and receives information from the server 30.

Figure 4:
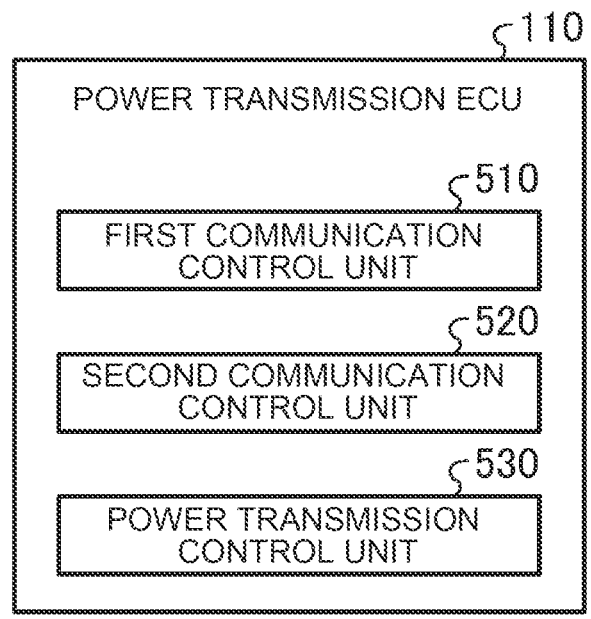
FIG. 4 is a block diagram for explaining the functional configuration of the power transmission ECU.

FIG. 4 is a block diagram showing the functional configuration of the power transmission ECU. Power transmission ECU 110 includes a first communication control unit 510, a second communication control unit 520, and a power transmission control unit 530.

The first communication control unit 510 executes first communication control to control the first communication device 120. The first communication control is to control wide area wireless communication on the side of the supply device 5, and controls communication of the supply device 5 using the first communication device 120. That is, the first communication control controls communication of the management device 8 of the supply device 5. The first communication control controls communication between the supply device 5 and the network 40 and also controls communication between the supply device 5 and the server 30 via the network 40. The first communication control unit 510 is a supply equipment communication controller (SECC).

The second communication control unit 520 executes second communication control to control the second communication device 130. The second communication control controls short-range wireless communication on the side of the supply device 5, and controls communication of the supply device 5 using the second communication device 130. That is, the second communication control controls communication of the segment 7 of the supply device 5. The second communication control controls communication between the supply device 5 and the vehicle 3 as communication not via the network 40. The second communication control unit 520 is a primary device communication controller (PDCC).

The power transmission control unit 530 executes power transmission control to control the power transmission device 10. Power transmission control is to control power for power transmission, and controls the power conversion unit 12 of the power transmission device 10. Power transmission control unit 530 executes power control to control PFC circuit 210 and inverter 220.

Figure 5:
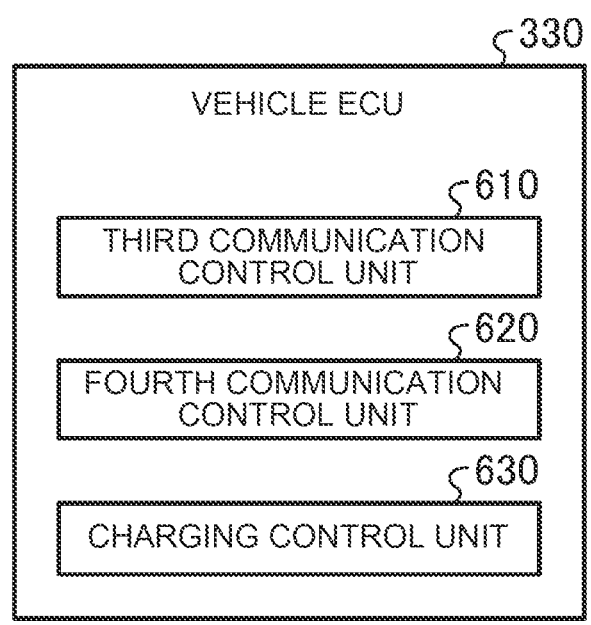
FIG. 5 is a block diagram for explaining the functional configuration of the vehicle ECU.

FIG. 5 is a block diagram showing the functional configuration of the vehicle ECU. Vehicle ECU 330 includes a third communication control unit 610, a fourth communication control unit 620, and a charging control unit 630.

The third communication control unit 610 executes third communication control to control the third communication device 340. The third communication control controls wide area wireless communication on the vehicle 3 side, and controls communication of the vehicle 3 using the third communication device 340. The third communication control controls communication between the vehicle 3 and the network 40 and also controls the communication between the vehicle 3 and the server 30 via the network 40. The third communication control unit 610 is an EV communication controller (EVCC).

The fourth communication control unit 620 executes fourth communication control to control the fourth communication device 350. The fourth communication control controls short-range wireless communication on the vehicle 3 side, and controls communication of the vehicle 3 using the fourth communication device 350. The fourth communication control controls communication between the vehicle 3 and the supply device 5 as communication not via the network 40. The fourth communication control unit 620 is a secondary device communication controller (SDCC).

Charging control unit 630 executes charging control to control power receiving device 20 and charging relay 310. The charging control includes power control that controls the received power in the power receiving device 20 and relay control that controls the connection state between the secondary device 22 and the battery 320. Charging control unit 630 executes power control to control rectifier circuit 430. Charging control unit 630 executes relay control to switch the open/closed state of charging relay 310.

In the wireless power transmission system 1 configured as described above, wireless power transmission from the supply device 5 to the vehicle 3 is performed in a state where wireless communication is established between the vehicle 3 and the supply device 5. In a state in which the vehicle 3 and the supply device 5 are paired by wireless communication, power is transmitted from the ground-side primary coil 11 to the vehicle-side secondary coil 21 in a non-contact manner. Then, in the vehicle 3, charging control is performed to supply the electric power received by the secondary coil 21 to the battery 320.

Next, the power transfer process (D-WPT process) will be explained with reference to FIG. 6. The power transfer process is structured as a chain of multiple activities and is a process derived from states and corresponding transitions.

Figure 6:
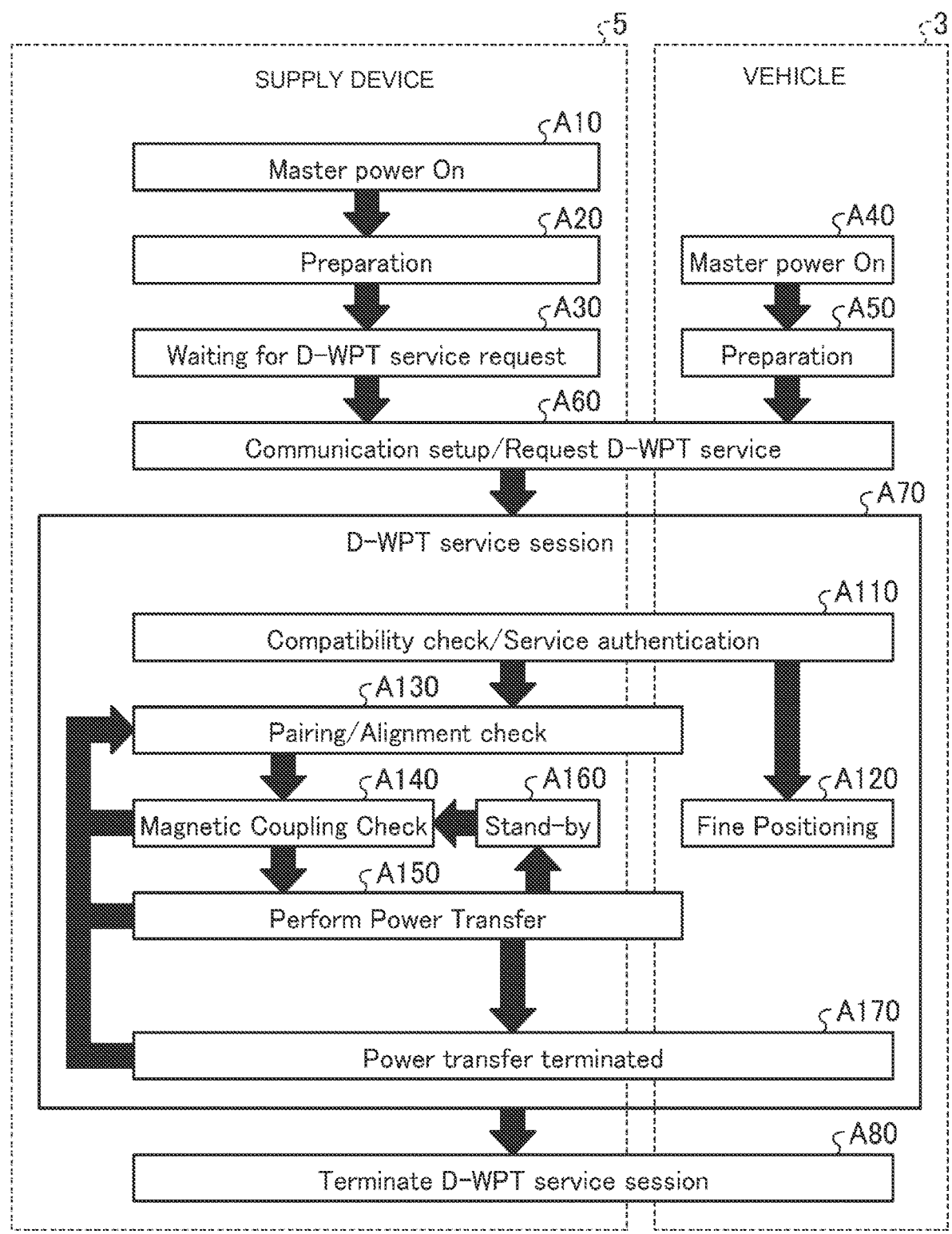
FIG. 6 is a diagram for explaining the power transfer process.

FIG. 6 is a diagram for explaining the power transfer process. In FIG. 6, basic activities are shown to explain the power transfer process. The thick arrows shown in FIG. 6 represent transition lines. The state of the wireless power transmission system 1 in the power transfer process is represented by activities that constitute the power transfer process.

The activities that make up the power transfer process are the power transfer service session (D-WPT service session A70) that is the activity at the stage of power transmission, the activity at the stage before power transmission, and the activity at the stage after power transmission. Further, the activity can be explained by dividing the main body of the operation depending on the presence or absence of communication between the supply device 5 and the vehicle 3. The activities can be divided into one that represents the state of only the supply device 5 side without communication, one that represents the state of only the vehicle 3 side without communication, and one that represents the state of both the supply device 5 and vehicle 3 that have communication.

As shown in FIG. 6, the activities include master power on state (master power on) A10, preparation A20, waiting for a request from vehicle 3 (Waiting for D-WPT service request) A30, master power on state (master power on) A40, preparation A50, communication setup and request D-WPT service A60, D-WPT service session A70, and terminate D-WPT service session A80.

The preparation A20 is the preparation state of the supply device 5. In the preparation A20, the supply device 5 performs circuit activation and safety confirmation without communication with the vehicle 3. The supply device 5 transitions to the state of the preparation A20 when the master power source enters the on state A10. If the supply device 5 activates the circuit and confirms safety in the preparation A20, the state changes to waiting for D-WPT service request A30 from the vehicle 3. On the other hand, if there is a problem with the supply device 5, the supply device 5 notifies the vehicle 3 of information indicating that the wireless power transmission system 1 cannot be used (notification of unavailability) through wide area wireless communication. The first communication device 120 transmits a notice of unavailability to the vehicle 3.

Preparation A50 is the preparation state of the vehicle 3. In preparation A50, the vehicle 3 activates the circuit and performs a safety check without communicating with the supply device 5. When the master power source enters the on state A40, the vehicle 3 transitions to the state of preparation A50. If the vehicle 3 activates the circuit and confirms safety in preparation A50, the state changes to the communication setup and request D-WPT service A60. On the other hand, if there is a problem with the vehicle 3, the vehicle 3 will not start wide area wireless communication and will not perform the subsequent sequences in the D-WPT process.

The communication setup and request D-WPT service A60 is initiated by the vehicle ECU 330. In the communication setup and request D-WPT service A60, vehicle ECU 330 starts wide area wireless communication. First, when the vehicle 3 transitions from preparation A50 to the communication setup and request D-WPT service A60, the third communication device 340 transmits a D-WPT service request signal. The third communication device 340 performs wireless communication with the first communication device 120 corresponding to the D-WPT lane into which the vehicle 3 is scheduled to enter or has entered. The first communication device 120 to be communicated with is selected based on the relative positional relationship between the current position of the vehicle 3 and the position of the D-WPT lane. On the supply device 5 side, in the state of the waiting for D-WPT service request A30 from the vehicle 3, when the first communication device 120 receives a D-WPT service request signal, the state changes to the communication setup and request D-WPT service A60. Various types of information between wide area wireless communication and P2PS communication are linked using vehicle identification information. The processing sequence of this communication setup and request D-WPT service A60 is shown in FIG. 7.

Figure 7:
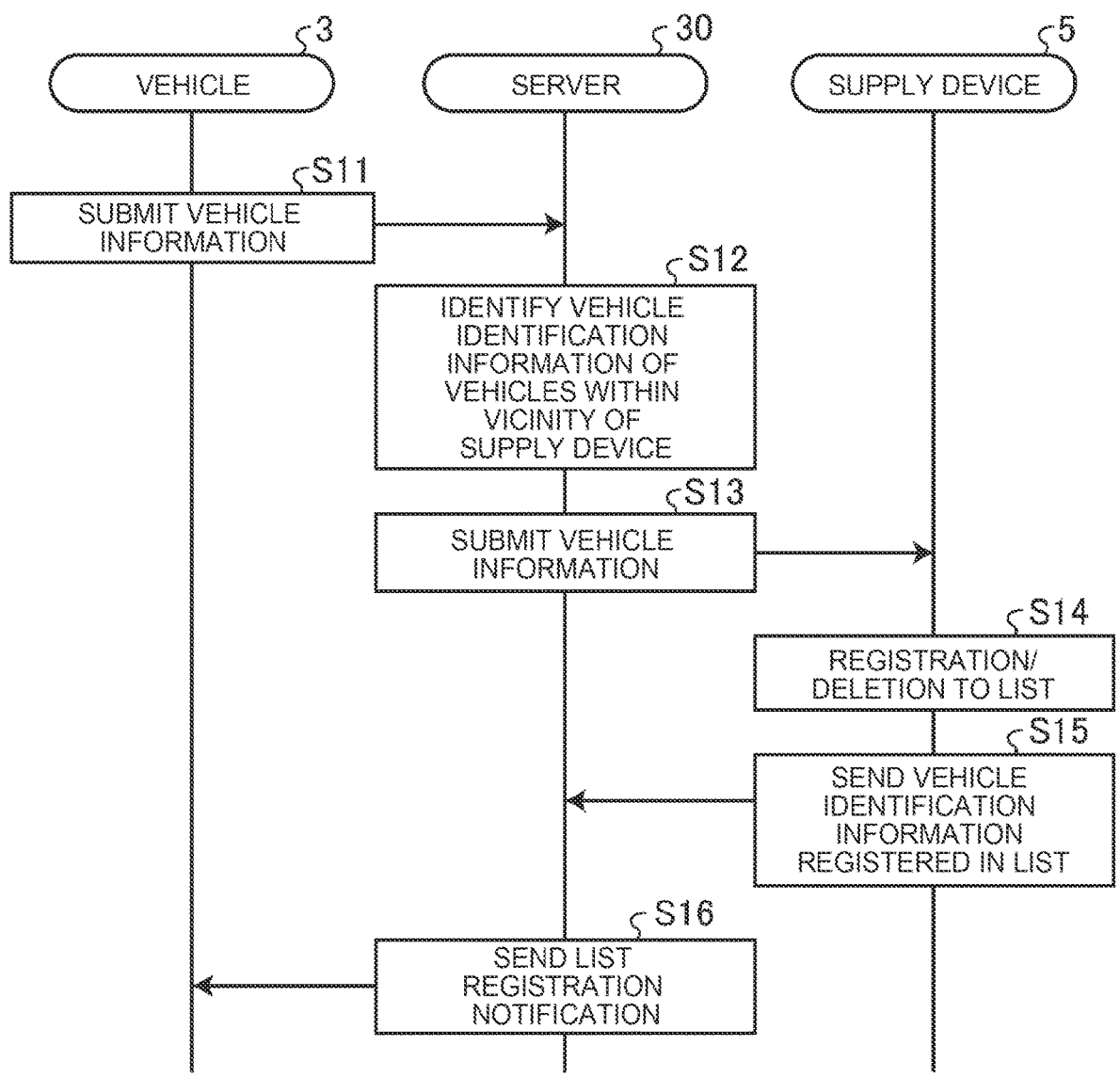
FIG. 7 is a sequence diagram showing a case where communication using wide area wireless communication is carried out between a vehicle and a supply device.

FIG. 7 is a sequence diagram showing a case where communication using wide area wireless communication is carried out between the vehicle and the supply device. The vehicle 3 transmits vehicle information to the server 30 (S11). In S11, the third communication device 340 of the vehicle 3 transmits vehicle information to the server 30. The vehicle information includes vehicle identification information, various parameters of the power receiving device 20, current position information of the vehicle 3, and requested power. Vehicle ECU 330 calculates the required power based on the state of charge (SOC) of battery 320. In S11, the vehicle ECU 330 causes the third communication device 340 to transmit vehicle information at predetermined time intervals. The predetermined time is set according to the distance from the current position of the vehicle 3 to the starting point of the WPT lane. The shorter the distance from the vehicle 3 to the starting point of the WPT lane, the shorter the predetermined time interval.

When the server 30 receives the vehicle information from the vehicle 3, it specifies the vehicle identification information of the vehicle 3 located in the vicinity of the supply device 5 based on the current position information of the vehicle 3 included in the vehicle information (S12). In S12, the server 30 identifies the vehicle 3 located within a predetermined vicinity area from the supply device 5 based on the current position information of the vehicle 3 and the position information of the supply device 5. The nearby area is set, for example, to an area within 500 meters.

After identifying the vehicle identification information of the vehicle 3, the server 30 transmits the vehicle information to the supply device 5 (S13). In S13, the transmitting device of the server 30 transmits vehicle information to the supply device 5.

When the supply device 5 receives the vehicle information from the server 30, it registers and deletes the vehicle identification information from the identification information list (S14). In S14, the power transmission ECU 110 registers and deletes vehicle identification information from the identification information list so that the vehicle identification information linked to the vehicle information is registered in the identification information list without excess or deficiency.

After registering and deleting the vehicle identification information from the identification information list, the supply device 5 transmits the vehicle identification information registered in the identification information list to the server 30 (S15). In S15, the first communication device 120 of the supply device 5 transmits vehicle identification information to the server 30.

Then, upon receiving the vehicle identification information from the supply device 5, the server 30 transmits a list registration notification to the vehicle 3 corresponding to the vehicle identification information registered in the identification information list (S16). In S16, the communication device of the server 30 transmits a list registration notification to the vehicle 3. The list registration notification is a notification indicating that the vehicle identification information is registered in the identification information list, and includes identification information of the supply device 5 and position information of the supply device 5.

In this way, when the vehicle 3 starts wide area wireless communication and both the supply device 5 and the vehicle 3 reach the state of the communication setup and request D-WPT service A60, it means that the communication setup by wide area wireless communication has been successful. With the success of this communication setup, the state transitions to the D-WPT service session A70.

Return to FIG. 6. In the D-WPT service session A70, in a state where a communication connection is established between the supply device 5 and the vehicle 3, power is transmitted from the power transmission side resonant circuit 240 of the supply device 5 to the power receiving side resonant circuit 410 of the vehicle 3 in a non-contact manner. The D-WPT service session A70 starts with successful communication setup and ends with the end of communication. When communication ends in the state of the D-WPT service session A70, the state changes to the terminate D-WPT service session A80.

At the terminate D-WPT service session A80, the vehicle 3 ends wide area wireless communication with the supply device 5. The vehicle 3 and the supply device 5 can receive a trigger for the termination of the D-WPT service session A70. Then, the vehicle ECU 330 prevents the secondary device 22 and the vehicle 3 from starting D-WPT until the third communication device 340 receives the next notification (D-WPT service request signal).

Here, detailed activities of the D-WPT service session A70 will be explained.

The D-WPT service session A70 includes compatibility check and service authentication A110, vehicle lateral fine positioning A120, and pairing and alignment check A130, magnetic coupling check A140, perform power transfer A150, stand-by A160, and power transfer terminated A170.

The compatibility check and service authentication A110 will be explained. After successful communication setup, vehicle ECU 330 and power transmission ECU 110 confirm that primary device 13 and secondary device 22 are compatible. The compatibility check is performed on the supply device 5 side based on information associated with vehicle identification information acquired through communication. Check items include the minimum ground clearance of the secondary device 22, the shape type of the secondary device 22, the circuit topology of the secondary device 22, the self-resonant frequency of the secondary device 22, the number of secondary coils 21, and the like.

In the compatibility check and service authentication A110, the vehicle 3 first transmits compatibility information of the power receiving device 20 from the third communication device 340 to the supply device 5. The first communication device 120 of the supply device 5 receives the compatibility information of the power receiving device 20 from the vehicle 3. Then, the first communication device 120 of the supply device 5 transmits the compatibility information of the power transmission device 10 to the vehicle 3. The third communication device 340 of the vehicle 3 receives the compatibility information of the power transmission device 10 from the supply device 5.

The elements of the compatibility information that the vehicle 3 sends to the supply device 5 include vehicle identification information, WPT power classes, air gap classes, WPT operating frequencies, WPT frequency adjustment, WPT type, WPT circuit topology, fine positioning method, pairing method, alignment method, presence/absence of power adjustment function information, etc.

Elements of the compatibility information that the supply device 5 sends to the vehicle 3 include supply device identification information, WPT power classes, gap classes, WPT operating frequencies, WPT frequency adjustment, WPT type, WPT circuit topology, fine positioning method, pairing method, alignment method, presence/absence of power adjustment function information, etc.

Each element name will be explained in detail. In addition, each element of the compatibility information transmitted from the vehicle 3 to the supply device 5 will be explained, and among the compatibility information transmitted from the supply device 5 to the vehicle 3, the compatibility information transmitted from the vehicle 3 to the supply device 5 Descriptions that overlap with the above will be omitted.

The gap class is information indicating a gap class from which the secondary device 22 can receive power. The WPT power class is information indicating a power class in which the secondary device 22 can receive power. The WPT drive frequency is information indicating the frequency of received power that the secondary device 22 receives. WPT frequency adjustment is information indicating whether or not the drive frequency can be adjusted. The WPT type is information indicating the shape type of the secondary device 22 and indicates the coil shape of the secondary coil 21. Examples of the WPT type include a circular shape and a solenoid shape. The WPT circuit topology is information indicating the connection structure between the secondary coil 21 and the resonant capacitor. WPT circuit topologies include series and parallel. The detailed positioning method is information indicating how to perform positioning. The pairing method is a method in which the vehicle 3 performs pairing to identify the supply device 5. The positioning method indicates a method of checking the relative positions of the secondary device 22 and the primary device 13 before starting power transmission.

Next, the vehicle lateral fine positioning A120 will be described. The vehicle 3 performs the vehicle lateral fine positioning A120 prior to or in parallel with the pairing and alignment check A130. When the vehicle ECU 330 determines that the vehicle 3 approaches or enters the area where the supply device 5 is installed (WPT lane), it starts the vehicle lateral fine positioning A120.

Vehicle ECU 330 guides vehicle 3 to align primary device 13 and secondary device 22 within a range that establishes sufficient magnetic coupling for wireless power transfer.

The vehicle lateral fine positioning A120 is basically performed manually or automatically on the vehicle 3 side. The vehicle lateral fine positioning A120 can be coordinated with ADAS (Automatic Driving Assistance System).

The activity of the vehicle lateral fine positioning A120 continues until the vehicle 3 leaves the D-WPT charging site or the state changes to end of communication, and can be performed based on alignment information transmitted from the supply device 5 to the vehicle 3 by wide area wireless communication. This end of communication refers to the terminate D-WPT service session A80.

Pairing/Alignment check A130 will be explained. Here, pairing and alignment check will be explained separately.

Explain pairing. The P2PS interface for short range wireless communication ensures that the primary device 13 and the secondary device 22 are uniquely paired. The process of pairing status is as follows.

First, vehicle ECU 330 recognizes that vehicle 3 has approached or entered the D-WPT lane. For example, the vehicle ECU 330 has map information including the D-WPT lane, and compares it with the position information of the own vehicle obtained by the GPS receiver 360 to recognize the approach or entry based on the straight line distance etc. The vehicle 3 transmits to the server 30 which D-WPT lane it has approached via wide area wireless communication. In short, the third communication device 340 notifies the cloud of a signal indicating that the vehicle 3 has approached any D-WPT lane. Further, when the vehicle ECU 330 recognizes that the vehicle 3 approaches or enters the D-WPT lane, the fourth communication device 350 starts transmitting the modulated signal at a constant interval for pairing of the primary device 13 and the secondary device 22.

Furthermore, the supply device 5 may recognize that the vehicle 3 has approached or entered the D-WPT lane using information acquired from the server 30 through wide area wireless communication. The server 30 allocates the vehicle identification information of the vehicle 3 approaching on each D-WPT lane to the supply device 5 corresponding to that lane. Since the supply device 5 only needs to refer to the vehicle identification information whose number has been narrowed down by the server 30, the authentication process can be performed in a short time. When the supply device 5 recognizes that the vehicle 3 is approaching the D-WPT lane, the second communication device 130 goes into standby mode. In standby mode, it waits to receive a modulated signal from the fourth communication device 350 of the vehicle 3. This modulated signal includes vehicle identification information.

When the second communication device 130 receives the modulated signal from the vehicle 3, the supply device 5 transmits the vehicle identification information received through short-range wireless communication and wide-area wireless communication with the plurality of vehicles 3 approaching the D-WPT lane. The vehicle identification information in the identification information list obtained as a result is compared. By this comparison, the supply device 5 identifies the vehicle 3.

When vehicle ECU 330 recognizes that vehicle 3 is outside the D-WPT lane, it stops transmitting the modulated signal from fourth communication device 350. The vehicle ECU 330 can determine whether the vehicle has passed through the D-WPT lane based on the map information and the position information of the vehicle.

The supply device 5 stops waiting for the modulated signal from the fourth communication device 350 when determining that the vehicle 3 is not traveling on the D-WPT lane or when determining that the vehicle 3 is not approaching the D-WPT lane.

Pairing is performed for the primary device 13 until the vehicle 3 leaves the D-WPT charging site or the state changes to communication terminated. When pairing is completed, the state transitions to alignment check.

The alignment check will be explained. The purpose of the alignment check is to ensure that the lateral distance between the primary device 13 and the secondary device 22 is within an acceptable range. The alignment check is performed using short range wireless communication (P2PS). Note that the configuration for alignment will be described later.

Alignment checks continue to be performed based on P2PS until the vehicle 3 leaves the D-WPT charging site or the state changes to End of Communication. The results of the alignment check can be transmitted from the first communication device 120 to the third communication device 340 via wide area wireless communication.

The magnetic coupling check A140 will be explained. In magnetic coupling check A140, the supply device 5 checks the magnetic coupling state and confirms that the secondary device 22 is within an acceptable range. When the magnetic coupling check A140 is completed, the state transitions to power transfer execution A150.

Execution A150 of power transmission will be explained. In this state, the supply device 5 transmits power to the power receiving device 20. The power transmission device 10 and the power receiving device 20 need to have the ability to control transmitted power (transmitted power and received power) for the usefulness of MF-D-WPT and the protection of the power receiving device 20 and battery 320. The greater power transfer helps traveling of longer distance without static wireless charging and conductive charging of the power receiving device 20. However, the capacity of the battery 320 varies depending on the model of the vehicle 3, and the demand for driving power may fluctuate rapidly. An example of this sudden change is sudden regenerative braking. When regenerative braking is performed while driving on the D-WPT lane, priority is given to regenerative braking, so that in addition to regenerative power, received power from power receiving device 20 is supplied to battery 320. In this case, in order to protect the battery 320 from overcharging, the power receiving device 20 needs to adjust the transmitted power.

Despite the necessity of power control, communication is not newly started between the supply device 5 and the power receiving device 20 in this state. This is because communication can impair response and accuracy in power control due to its instability and latency. Therefore, the supply device 5 and the power receiving device 20 perform power transmission and control thereof based on known information up to this state.

The supply device 5 uses wide area wireless communication in advance to increase the transmission power for the magnetic coupling check in response to the power request transmitted from the third communication device 340. The supply device 5 attempts to keep the current and voltage fluctuations within its limits and to maximize the power transferred during the transition.

The power receiving device 20 basically receives the transmitted power from the power transmission device 10 without any control. However, the power receiving device 20 starts control when the transmitted power exceeds or is about to exceed the limit, such as the rated power of the battery 320, which varies depending on the state of charge and the power demand for driving the vehicle 3. Furthermore, the power control in the vehicle ECU 330 is also required to deal with malfunctions in wide area wireless communication. This malfunction leads to a contradiction between the power control target in the primary device 13 and a request from the third communication device 340, and a sudden failure of the power receiving device 20 and battery 320 during power transmission. The power receiving device 20 controls the transmitted power based on the power request rate notified by the first communication device 120.

The power requirements are determined based on compatibility check information such as WPT circuit topology, geometry, ground clearance, EMC (electromagnetic compatibility), etc. of the vehicle 3 and primary device 13. The magnetic field varies depending on these specifications, and it is necessary to transmit power within a range that satisfies EMC.

Power control in power transmission ECU 110 and power receiving device 20 may interfere with each other. In particular, there is a possibility of interference when the supply device 5 attempts to realize a power request larger than the latest power limit in the power receiving device 20 through wide area wireless communication. An example of this is rapid regeneration control using a relatively small battery 320 in the vehicle 3. If possible, it is desirable that the supply device 5 be able to detect mismatches between power control goals and limits and adjust the power transfer to resolve the mismatches.

If the secondary device 22 is still on top of the primary device 13, for example, if a foreign object is detected on the primary device 13 by the foreign object detection device 140, or if the magnetic coupling is low due to misalignment of the secondary device 22. If power transfer is interrupted for a short period of time, the state transitions to Stand-by A160. Note that if the vehicle 3 is provided with a foreign object detection device, the foreign object may be detected on the vehicle 3 side.

When the secondary device 22 passes over the primary device 13, the state transitions to the power transfer terminated A170. In this case, less power is transferred because the magnetic coupling between the two devices is weaker. The supply device 5 can detect that the magnetic coupling has weakened by monitoring the transmitted power, so the supply device 5 basically determines the state transition to the power transfer terminated A170, and then the power Start reducing voltage to stop transmission.

Standby A160 will be explained. In this state, the power transfer is briefly interrupted for some reason, and once the D-WPT is ready in both the vehicle 3 and the supply device 5, the state returns to power transfer execution A150. If there is a possibility of interrupting power transmission, it becomes standby A160.

Figure 8:
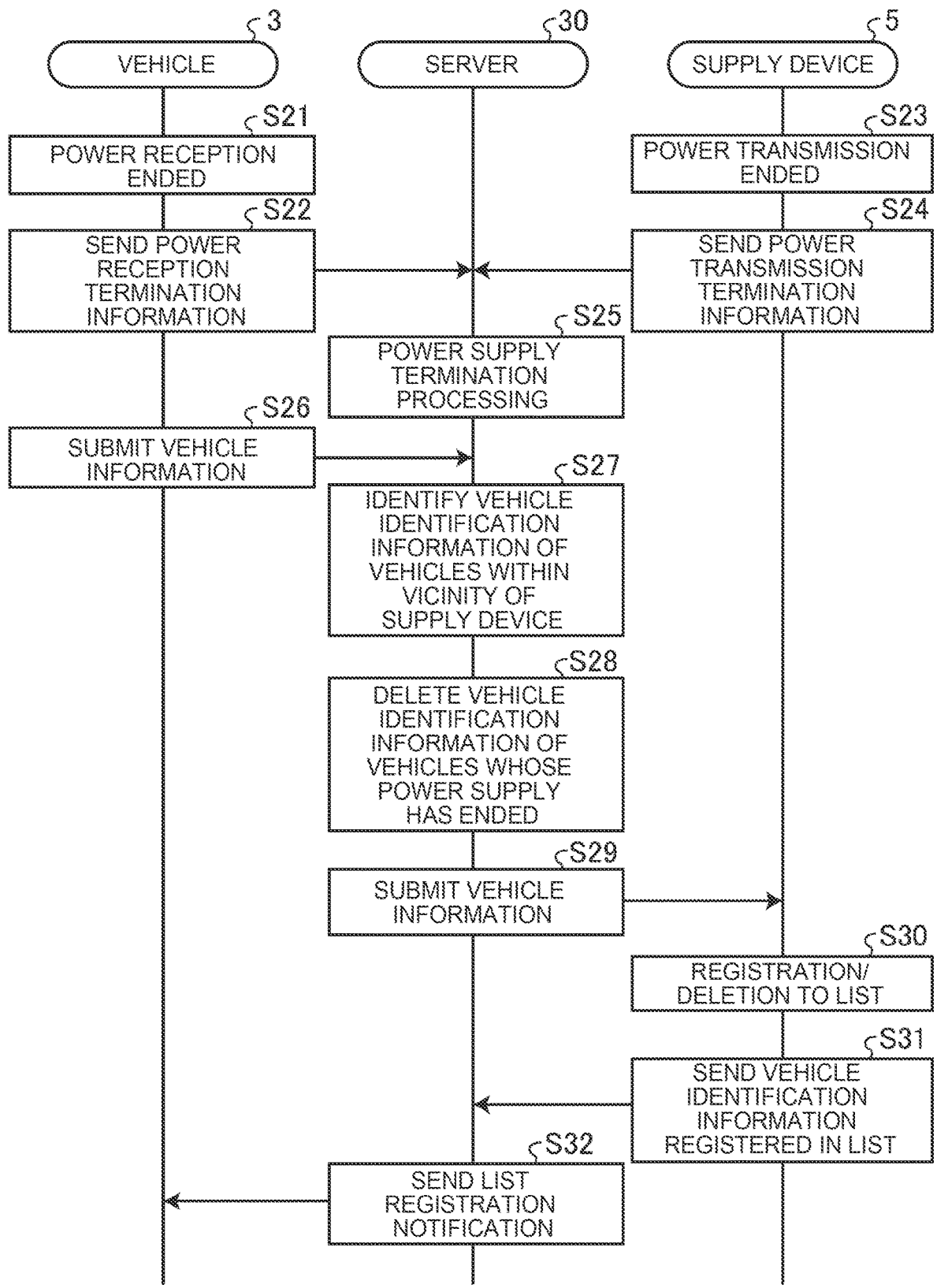
FIG. 8 is a sequence diagram showing the operation after the power supply from the supply device to the vehicle while running is completed.

Next, the power transfer terminated A170 will be explained. In this state, the supply device 5 reduces the transmitted power to zero and retains or uploads power transmission result data such as total transmitted power, power transmission efficiency, and failure history. Each piece of data is tagged with vehicle identification information. Finally, the supply device 5 deletes the vehicle identification information of the vehicle 3 that has passed through the D-WPT lane. Thereby, the supply device 5 can prepare for pairing and power transmission to be performed later on to other vehicles. FIG. 8 shows the processing sequence for the power transfer terminated A170.

FIG. 8 is a sequence diagram showing the operation after the power supply from the supply device to the vehicle while running is completed. When the power receiving device 20 of the vehicle 3 finishes receiving power from the supply device 5 (S21), the vehicle 3 transmits power reception end information to the server 30 (S22). In S22, power reception end information is transmitted from the third communication device 340 of the vehicle 3. The power reception end information includes, as information regarding power reception from the supply device 5, for example, vehicle identification information of the vehicle 3, received power from the supply device 5, power reception efficiency, and an abnormality detection result.

The supply device 5 ends power transmission to the vehicle 3 when the process of S21 is performed (S23). The processing in S21 and the processing in S23 may or may not be performed simultaneously. When the process of S23 is executed, the supply device 5 transmits power transmission end information to the server 30 (S24). In S24, power transmission end information is transmitted from the first communication device 120 of the supply device 5.

When the server 30 receives the power reception end information from the vehicle 3 and the power transmission end information from the supply device 5, it performs a power supply end process to end the power supply from the supply device 5 to the vehicle 3 (S25). In the power supply termination process, based on the power reception termination information and the power transmission termination information, a process of calculating the amount of power supplied from the supply device 5 to the vehicle 3 and a process of charging the user of the vehicle 3 based on the calculated amount of supplied power are performed.

Furthermore, the vehicle 3 transmits vehicle information to the server 30 regardless of the power supply termination process (S26). In S26, vehicle information is transmitted from the third communication device 340 of the vehicle 3.

When the server 30 receives the vehicle information from the vehicle 3 after performing the power supply termination process, the server 30 specifies the vehicle identification information of the vehicle 3 located within the vicinity of each supply device 5 based on the vehicle information (S27).

Then, if the power supply termination process for a certain vehicle 3 has already been performed in a certain supply device 5, the server 30 uses the vehicle identification information of the vehicle 3 in the vicinity area of this supply device 5 specified in the process of S27, the vehicle identification information of the vehicle 3 for which the power supply termination process has already been performed is deleted (S28).

After that, the server 30 transmits to each supply device 5 the vehicle information linked to the vehicle identification information that has not been deleted in the process of S28, among the vehicle identification information of the vehicle 3 identified as being located in the vicinity area of each supply device 5 (S29).

After the vehicle information is transmitted to each supply device 5 in the process of S29, when the supply device 5 receives the vehicle information from the server 30, the supply device 5 registers and deletes the vehicle identification information from the identification information list (S30). The process at S30 is similar to the process at S14 in FIG. 7. After that, the supply device 5 transmits the vehicle identification information registered in the identification information list to the server 30 (S31). The process at S51 is similar to the process at S15 in FIG. 7.

Then, upon receiving the vehicle identification information from the supply device 5, the server 30 transmits a list registration notification to the vehicle 3 corresponding to the vehicle identification information registered in the identification information list (S32). The process at S32 is similar to the process at S16 in FIG. 7.

As a result, when the process shown in FIG. 8 is performed, the identification information list indicates that the vehicle is located within the vicinity of each supply device 5, the power supply from the supply device 5 has not ended, and the vehicle This means that vehicle identification information is registered for the vehicle 3 for which a request to erase the identification information has not been made. Then, when the vehicle identification information of the vehicle 3 is registered in the identification information list of any of the supply facilities 2, the vehicle 3 receives a list registration notification. Therefore, by receiving the list registration notification, vehicle ECU 330 can determine whether the own vehicle is registered in any of the supply devices 5. When the vehicle 3 moves out of the vicinity of the supply device 5, the vehicle identification information of the vehicle 3 is deleted from the identification information list of the supply device 5.

Return to FIG. 6. Further, at the power transfer terminated A170, the power receiving device 20 does not need to do anything to reduce the transmitted power to zero. The P2PS interface is kept active when the vehicle 3 is in the D-WPT lane, and the state of the power receiving device 20 automatically transitions to pairing for power transmission from the next primary device 13. As shown in the transition line shown in FIG. 6, the state transitions from the power transfer terminated A170 to pairing and alignment check A130. As shown in FIG. 6, when predetermined transition conditions are met, a transition occurs from magnetic coupling check A140 to pairing and alignment check A130, and a transition from power transfer execution A150 to pairing and alignment check A130. It is possible to do so. Pairing may be performed for each of the plurality of primary coils 11 individually, or may be performed at a representative point by bundling the plurality of primary coils 11.

Then, the D-WPT service session A70 is prohibited if there is no D-WPT request from the vehicle ECU 330, or a series of states from the communication setup and request D-WPT service A60 to the power transfer terminated A170 are prohibited. In this case, the process moves to the terminate D-WPT service session A80, and wide area wireless communication between the first communication device 120 and the third communication device 340 is stopped. For example, D-WPT shuts down when the state of charge in battery 320 is too high or when power receiving device 20 is too hot for continuous power transfer. Such unnecessary D-WPTs can be disabled by simply deactivating the P2PS interface. However, by stopping the wide area wireless communication, the power transmission ECU 110 can release the memory occupied for the vehicle 3 without requiring D-WPT by terminating the established wide area wireless communication.

Furthermore, the D-WPT service session A70 is not limited to transitions like the transition line shown in FIG. 6. When the pairing and alignment check A130 and subsequent activities are completed in the D-WPT service session A70, and the conditions for the power transfer process to remain in the D-WPT service session A70 are met, no transition is made to the terminate D-WPT service session A80, and a transition is made to compatibility check and service authentication A110. For example, if a predetermined transition condition is satisfied in the magnetic coupling check A140 state, the state can transition to compatibility check and service authentication A110.

Here, the arrangement of the second communication device 130 and the fourth communication device 350 will be described with reference to FIG. 9. FIG. 9 is a diagram for explaining the arrangement of the second communication device and the fourth device. Note that in FIG. 9, an arrow $D_F$ indicates the traveling direction of the vehicle 3 (hereinafter also referred to as the traveling direction $D_F$). This traveling direction $D_F$ is the forward direction of the vehicle 3. That is, in the vehicle 3, the front side in the traveling direction $D_F$ is the front side in the traveling direction $D_F$, and the rear side in the traveling direction $D_F$ is the rear side in the traveling direction $D_F$. Further, in the vehicle 3, a direction perpendicular to the traveling direction $D_F$ and the vertical direction of the vehicle 3 (a direction perpendicular to the plane of the paper in FIG. 1) is defined as a lateral direction.

The fourth communication device 350 includes one communication unit located on the forward side of the traveling direction $D_F$ with respect to the secondary coil 21. The fourth communication device 350 is provided at the center of the secondary coil 21 in the lateral direction of the vehicle 3.

The second communication device 130 provided in the segment 7 has two communication units (communication units 130a and 130b) located on the rear side in the traveling direction $D_F$ with respect to the primary coil 11.
Note that each communication unit employs the configuration related to the above-mentioned short-range wireless communication.

Here, the primary coil 11 and the second communication device 130 may be integrally mounted on a substrate forming the segment 7, or each may be mounted on a different substrate. Further, the secondary coil 21 and the fourth communication device 350 may be integrally mounted on a substrate that constitutes the power receiving device 20, or may be mounted on different substrates.

The communication units 130a and 130b are provided side by side in the width direction of the road 4 (here, a direction corresponding to the lateral direction of the vehicle 3 traveling on the road 4), and are arranged opposite to each other with respect to the widthwise center of the primary coil 11, and at a position apart from this central part by the same distance. That is, when the power receiving device 20 passes over the segment 7, when the widthwise central portion of the primary coil 11 and the horizontally central portion of the secondary coil 21 are located on the same straight line extending in the traveling direction, The fourth communication device 350 passes through the center between the communication units 130a and 130b.

Thereby, the position of the secondary coil 21 with respect to the primary coil 11 can be adjusted when the communication units 130a and 130b communicate with the fourth communication device 350 by short range wireless communication. Specifically, for example, the signal strength when the communication units 130a and 130b each communicate with the fourth communication device 350 is detected, and based on the magnitude relationship of the signal strength, the deviation of the secondary coil 21 in the width direction with respect to the primary coil 11 is detected. When the communication units are arranged as described above, if the signal strengths of the communication units 130a and 130b are equal, no deviation has occurred, and it can be determined that the larger the difference in this strength, the greater the deviation. Furthermore, the direction of deviation can be detected from the magnitude relationship of the intensities.

Further, when the vehicle 3 moves in the traveling direction $D_F$, before the secondary coil 21 passes over the primary coil 11, in addition to the vehicle identification information, a power supply request, a power supply request value, and the like are transmitted from the vehicle 3 to the supply device 5 using short-range wireless communication between the second communication device 130 and the fourth communication device 350.

Here, when the communication units 130a and 130b are configured using coils, in order to improve detection accuracy, it is preferable that the winding manner be symmetrical with respect to the axis extending in the traveling direction $D_F$.

In the present embodiment described above, in the wireless power transmission system 1, two communication units (communication units 130a and 130b) are provided in the segment 7 for the fourth communication device 350 provided in the vehicle 3. When the vehicle 3 is moving in the traveling direction $D_F$ and the secondary coil 21 is passing over the primary coil 11, short range wireless communication is performed between the second communication device 130 and the fourth communication device 350. According to the present embodiment, in order to detect the position of the communication unit (fourth communication device 350) of the power receiving device 20 using two communication units, in the wireless power transmission system 1, it is possible to detect the positional relationship between the secondary coil 21 of the vehicle 3 and the primary coil 11 of the segment 7 with high precision. As a result, in the wireless power transmission system 1, the power transmitting side and the power receiving side can be aligned with high precision.

Furthermore, in the embodiment, when the power transmission ECU 110 performs positioning using the result of communication with the fourth communication device 350 by the second communication device 130, position detection is possible without performing wide area wireless communication. The position detection speed is fast and alignment can be performed at high speed.

Modification

Next, a modification of the embodiment will be described with reference to FIG. 10. In the modified example, the arrangement of the second communication device and the fourth device is different from the embodiment. FIG. 10 is a diagram for explaining the arrangement of the second communication device and the fourth device in a modified example. Note that in FIG. 10, the arrow $D_F$ indicates the traveling direction of the vehicle 3, similarly to FIG. 9.

In the modified example, the second communication device 130 includes one communication unit located on the forward side of the traveling direction $D_F$ with respect to the primary coil 11. The second communication device 130 is provided at the center of the primary coil 11 in the width direction of the road 4. The width direction here corresponds to a direction perpendicular to the direction of extension of the road 4 and the direction of gravity, and will be explained assuming that it is the same direction as the lateral direction of the vehicle 3.

The fourth communication device 350 has two communication units (communication units 350a and 350b) located on the rear side in the traveling direction $D_F$ with respect to the secondary coil 21. The communication units 350a and 350b are provided side by side in the lateral direction of the vehicle 3, and are provided at positions opposite to each other with respect to the lateral center portion of the secondary coil 21 and at the same distance from the center portion. That is, when the power receiving device 20 passes over the segment 7, when the widthwise central portion of the primary coil 11 and the horizontally central portion of the secondary coil 21 are located on the same straight line extending in the traveling direction, The second communication device 130 will pass through the center between the communication units 350a and 350b.

In the modified example, the communication units 350a and 350b each perform short-range wireless communication with the second communication device 130, so that the position of the secondary coil 21 with respect to the primary coil 11 can be adjusted. Specifically, for example, the communication units 350a and 350b each detect the signal strength when communicating with the second communication device 130, and based on the magnitude relationship of the signal strength, the secondary coil 21 is connected to the primary coil 11. Detect the deviation in the width direction. When the communication units are arranged as described above, if the signal intensities of the communication units 350a and 350b are equal, no deviation has occurred, and it can be determined that the larger the difference in this intensity, the greater the deviation. Furthermore, the direction of deviation can be detected from the magnitude relationship of the intensities.

Here, when the communication units 350a and 350b are configured using coils, from the viewpoint of improving detection accuracy, it is preferable that the winding manner be symmetrical with respect to the axis extending in the traveling direction $D_F$.

Further, similarly to the embodiment, when the vehicle 3 moves in the traveling direction $D_F$, before the secondary coil 21 passes over the primary coil 11, the communication between the second communication device 130 and the fourth communication device 350 is detected. In addition to the vehicle identification information, a power supply request, a power supply request value, and the like are transmitted from the vehicle 3 to the supply device 5 by short-range wireless communication.

In this modification described above, in the wireless power transmission system 1, two communication units (communication units 350a and 350b) are provided in the vehicle 3 for the second communication device 130 provided in the segment 7. When the vehicle 3 is moving in the traveling direction $D_F$ and the secondary coil 21 is passing over the primary coil 11, short range wireless communication is performed between the second communication device 130 and the fourth communication device 350. According to this modification, in order to detect the position of the communication unit (second communication device 130) of the segment 7 by two communication units, in the wireless power transmission system 1, it is possible to detect the positional relationship between the secondary coil 21 of the vehicle 3 and the primary coil 11 of the segment 7 are with high precision. As a result, in the wireless power transmission system 1, the power transmitting side and the power receiving side can be aligned with high precision.

Furthermore, according to the modified example, position detection is performed using the communication results of the two communication units provided on the vehicle 3 side, so even if there is a disturbance generating factor such as a puddle on the road, the disturbance position detection can be performed while suppressing the influence of Note that in the embodiments and modified examples, a configuration in which one communication unit has one (single) communication unit and the other communication unit has two communication units has been described as an example, but the number of communication units in each communication device is not limited to this. For example, the other may have three or more communication units, or each may have two or more communication units. For example, in the case of having three communication units, the communication units are provided at the center and both ends of the coil in the width direction of the coil, and based on the signal strength of each communication unit, the vehicle 3 (secondary coil 21) and the segment 7 (The positional relationship with the primary coil 11) is detected.

Further, in the embodiment and the modified example, the fourth communication device 350 communicates only with the second communication device 130 associated with the first segment 7 of the supply device 5, and does not communicate with other segments 7. Alternatively, all segments 7 may be thinned out for communication. Furthermore, the number and arrangement of the communication units in the second communication device 130 can be appropriately set depending on the type of road (for example, straight line or curve).

Further advantages and modifications can be easily deduced by those skilled in the art. Therefore, the broader aspects of the disclosure are not limited to the specific details and representative embodiments shown and described above. Accordingly, various changes may be made without departing from the spirit or scope of the general inventive concept as defined by the appended claims and their equivalents.

What is claimed is:

1. A wireless power transmission system comprising:
   a supply device that is installed on a road and transmits power; and
   a vehicle that is equipped with a power receiving device and travels on the road, wherein:
   the power receiving device receives the power from the supply device and wirelessly transmits the power to the vehicle;
   the supply device includes
     a primary coil that generates a magnetic field for power transmission to the vehicle, and
     a first communication device including a single communication unit, the single communication unit being a first coil disposed at a center of the primary coil in a road width direction, wherein the road width direction is a direction perpendicular to a vehicle traveling direction;
   the vehicle includes
     a secondary coil that receives power transmitted from the primary coil in a non-contact manner, and
     a second communication device that performs short-range wireless communication with the first communication device, the second communication device including two communication units, and the two communication units including a second coil and a third coil disposed side by side in a vehicle width direction that is perpendicular to the vehicle traveling direction; and
   a gap in the vehicle width direction between the second coil and the third coil is wider than a length of the first coil in the road width direction.

2. A wireless power transmission system comprising:
   a supply device that is installed on a road and transmits power; and
   a vehicle that is equipped with a power receiving device and travels on the road, wherein:
   in the wireless power transmission system, the power receiving device receives the power from the supply device and wirelessly transmits the power to the vehicle;
   the supply device includes
     a primary coil that generates a magnetic field for power transmission to the vehicle, and
     a first communication device including two communication units, the two communication units including a first coil and a second coil disposed side by side in a road width direction, wherein the road width direction is a direction perpendicular to a vehicle traveling direction;
   the vehicle includes
     a secondary coil that receives power transmitted from the primary coil in a non-contact manner, and
     a second communication device that performs short-range wireless communication with the first communication device, the second communication device including a single communication unit, and the single communication unit being a third coil disposed at a center of the secondary coil in a vehicle width direction that is perpendicular to the vehicle traveling direction; and
   a gap in the road width direction between the first coil and the second coil is wider than a length of the third coil in the vehicle width direction.

3. The wireless power transmission system according to claim 1, wherein
   a winding direction of the second coil and a winding direction of the third coil are symmetrical with respect to an axis extending in the vehicle traveling direction.

4. The wireless power transmission system according to claim 1, wherein
   the second communication device transmits information to the first communication device before the secondary coil passes over the primary coil, and
   the information includes vehicle identification information, a power transmission request, and a request value of the power in the power transmission.

5. The wireless power transmission system according to claim 1, wherein
   in the vehicle width direction, an outer end of the second coil and an outer end of the third coil are positioned inward of outer ends of the secondary coil.

6. The wireless power transmission system according to claim 2, wherein
   a winding direction of the first coil and a winding direction of the second coil are symmetrical with respect to an axis extending in the vehicle traveling direction.

7. The wireless power transmission system according to claim 2, wherein
   the second communication device transmits information to the first communication device before the secondary coil passes over the primary coil, and the information includes vehicle identification information, a power transmission request, and a request value of the power in the power transmission.

8. The wireless power transmission system according to claim 2, wherein
in the road width direction, an outer end of the first coil and an outer end of the second coil are positioned inward of outer ends of the primary coil.

9. A wireless power transmission system comprising:
a supply device that is installed on a road and transmits power; and
a vehicle that is equipped with a power receiving device and travels on the road, wherein:
the power receiving device receives the power from the supply device and wirelessly transmits the power to the vehicle;
the supply device includes
a primary coil that generates a magnetic field for power transmission to the vehicle, and
a first communication device including a single communication unit, the single communication unit being a first coil disposed at a center of the primary coil in a road width direction, wherein the road width direction is a direction perpendicular to a vehicle traveling direction;
the vehicle includes
a secondary coil that receives power transmitted from the primary coil in a non-contact manner, and
a second communication device that performs short-range wireless communication with the first communication device, the second communication device including two communication units, and the two communication units including a second coil and a third coil disposed side by side in a vehicle width direction that is perpendicular to the vehicle traveling direction; and
the second coil is disposed at a first end of a predetermined side of the secondary coil and the third coil is disposed at a second end of the predetermined side of the secondary coil.

10. The wireless power transmission system according to claim 9, wherein
the secondary coil is in a rectangular shape comprising the predetermined side and three sides.

11. The wireless power transmission system according to claim 10, wherein
the predetermined side is positioned on a front side of the vehicle traveling direction.

12. The wireless power transmission system according to claim 5, wherein
the second coil and the third coil are disposed at positions opposite to each other with respect to the center of the secondary coil in the vehicle width direction, and are disposed at the same distance from the center of the secondary coil.

13. The wireless power transmission system according to claim 1, wherein the single communication unit is disposed in a vicinity of, and offset from, a lateral center of the primary coil in the road width direction.

14. The wireless power transmission system according to claim 1, wherein the second coil and the third coil are disposed side by side in the vehicle width direction in a vicinity of the secondary coil.

15. The wireless power transmission system according to claim 2, wherein the single communication unit is disposed in a vicinity of a lateral center of the secondary coil in the road width direction.

16. The wireless power transmission system according to claim 2, wherein the second coil and the third coil are disposed side by side in the vehicle width direction in a vicinity of, and offset from, a lateral center of the primary coil.

17. The wireless power transmission system according to claim 5, wherein the second coil and the third coil are symmetrically arranged on opposite sides of the center of the secondary coil in the vehicle width direction, and are equidistant from the center of the secondary coil.

* * * * *